H. L. MAINLAND.
ANIMAL TRAP.
APPLICATION FILED FEB. 16, 1911.
1,012,386.
Patented Dec. 19, 1911.
2 SHEETS—SHEET 1.
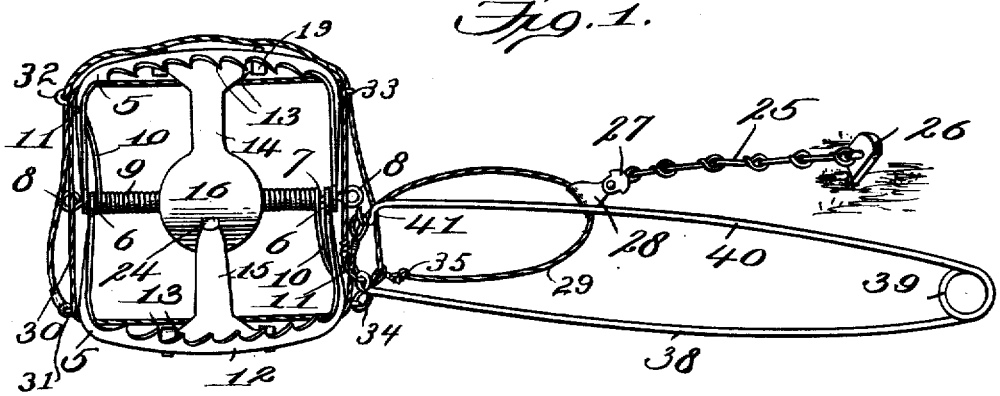
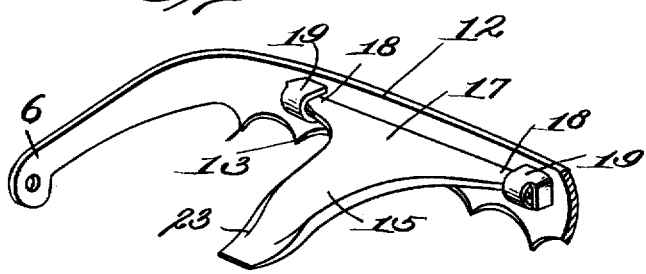
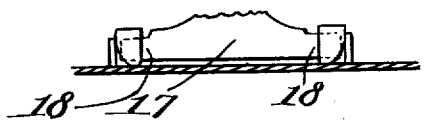
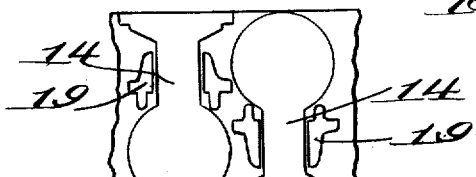
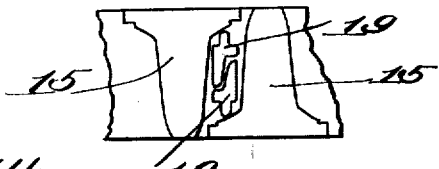
Witnesses
Inventor
Hugh L. Mainland
by James L. Norris, Jr.
Atty.

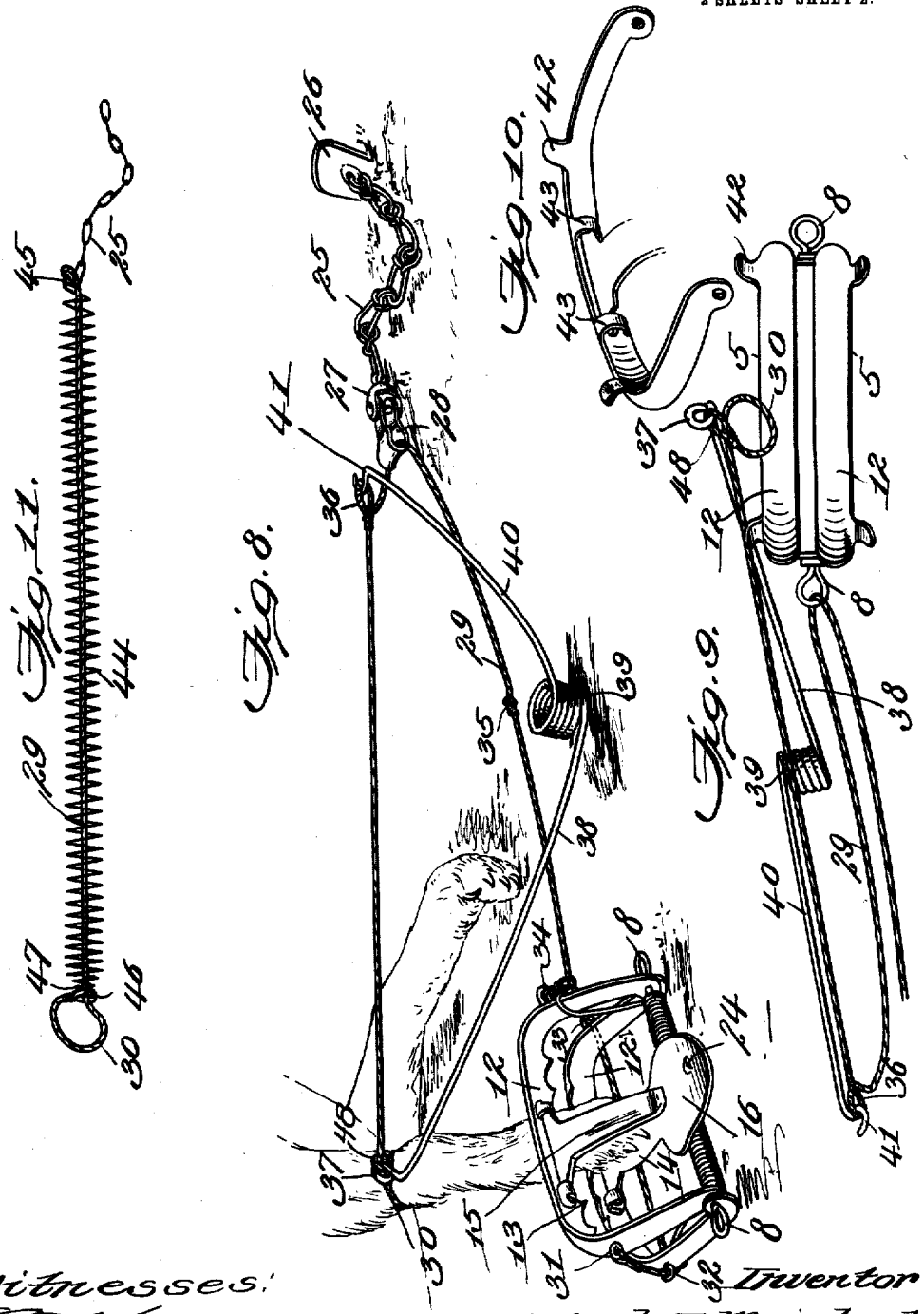

UNITED STATES PATENT OFFICE.

HUGH L. MAINLAND, OF BURKES, NEAR DUNEDIN, NEW ZEALAND.

ANIMAL-TRAP.

1,012,386.  Specification of Letters Patent.  Patented Dec. 19, 1911.

Application filed February 16, 1911. Serial No. 608,902.

*To all whom it may concern:*

Be it known that I, HUGH L. MAINLAND, a subject of the King of Great Britain, residing at Burkes, near Dunedin, New Zealand, have invented new and useful Improvements in Animal-Traps, of which the following is a specification.

This invention relates to animal traps and consists mainly of a spring-actuated noose coöperating with means for holding the same set, such as a pair of spring-actuated jaws having devices for setting the same in open condition and releasable by pressure exerted thereon.

The spring-actuated noose is preferably formed as a part of the trap tether and is so operated when the trap is released as to be thrown high upon the leg with obvious advantages in preventing escape of the animal. The trap used in conjunction with the noose serves a secondary purpose as compared with the primary object of securing the animal by the noose, and the trap structure may or may not embody teeth and when without teeth it will be readily thrown off from the leg of the animal and the noose forming part of the strand or thong, such as the tether, will be relied upon as the sole means of holding the animal against escape. It will therefore be understood that the trap serves principally to hold the noose open or in set condition to facilitate stepping therein to and a positive engagement with the leg of the animal when the trap is released by the action of a spring which not only tends to tightly close the noose about the leg of the animal, but in some constructions to throw the noose upwardly before it is drawn taut.

By the use of the noose as a securing means and the absence of teeth on the trap jaws or gripping bars, the animal is not only securely held independently of the trap, but tearing and laceration or other injury to the leg of the animal is obviated.

The invention also consists in the details of construction and arrangement of the several parts which will be more fully hereinafter specified.

The present invention embodies features of improvement on the trap disclosed by my Letters Patent No. 887,675, dated May 12, 1908, and the trap disclosed by my application Serial No. 598,858, filed December 22, 1910.

In the drawings: Figure 1 is a top plan view of a trap embodying the features of the invention and shown in set condition. Figs. 2, 3, 4 and 5 are detail views of portions of the trap showing improved structural features. Figs. 6 and 7 are plan views of portions of strips of metal stock showing the manner of cutting out parts of the trap from the stock with the least possible waste. Fig. 8 is a perspective view of the improved trap shown sprung or released and as holding the leg of an animal. Fig. 9 is an elevation of a trap embodying the features of the invention and showing the tether wire, cord or thong loosely connected to one extremity of the trap and the gripping bars or jaws of the trap without teeth. Fig. 10 is a detail perspective view of one of the jaws of the trap shown by Fig. 9 and illustrating a part of the setting means in connection therewith. Fig. 11 is a detail view showing a coiled spring engaging the securing wire, cord or thong or tether for operating the noose.

Referring to Figs. 1, 2, 3, 4, 5 and 8, the numeral 5 designates the jaws of a trap which are preferably of substantial U-shape and have the ends of their legs provided with eyes 6 which are assembled in close relation and movably or pivotally connected by a pintle rod 7 having securing eyes or loops 8 at opposite ends. Loosely mounted on the rod 7 is a coiled spring 9 having the coils thereof closely disposed relatively to each other and providing a spring cylinder or tube with an inner diameter materially greater than the diameter of the rod 7, so that the said rod is free to act as a pivot means for the jaws without interference by the spring, and the latter is unrestricted in performing its function and is also free to be tightened or wound, or unwound and loosened as may be necessary while in place on the rod 7. The opposite extremities of the spring 9 have legs 10 continuing therefrom in opposite directions, there being one leg at each extremity of the spring terminating in a hook 11 to removably engage the outer edge portion of the leg of the nearest jaw, the legs 10 of the spring engaging similar portions of the opposing jaws so that when the trap is released the jaws will be forcefully closed.

The biting, gripping or clamping bars 12 of the jaws are preferably channeled, as clearly shown by Figs. 2 and 3, and are provided with teeth 13 at their inner edges, the said teeth being bent inwardly and laterally toward the side of the trap adjacent to its anchorage, the sets of teeth of the two jaws being so disposed that the one set will be moved or projected between the set of teeth of the remaining jaw.

The trip and setting devices for the trap are very simple and are substantially the same as those disclosed by my patent and application hereinbefore mentioned except in the particulars as to details of structure which will be now explained. The trip and setting devices embody two plates 14 and 15, the plate 14 having an inner circular extremity 16 which provides an extended pressure surface and an outer securing head 17 with reduced extremities 18 projecting into keepers 19, shown in detail by Fig. 5, and consisting in each instance of an inner looped extremity 20 bent over under one of the reduced extremities 18 of the head 17 and also provided with an outer inwardly bent guard or stop flange 21, the stop flanges of the two keepers or sockets 19 limiting the lateral movement of the head 17 and the plate 14 as a whole. Each keeper or socket 19 also has a securing tongue 22 which is projected through a suitable opening in the gripping bar 12 and bent over or upset, as clearly shown by Fig. 3. The plate 15 is in the form of a narrow arm and has a head 17 similar to that just described and movably attached to the gripping bar 12 of its jaw by similar keepers or sockets 19. The inner free end of the plate 15 is bent as at 23 and reduced to engage a projection 24 on the pressure extremity 16 of the plate 14 to hold the jaws of the trap open or in set condition. Figs. 6 and 7 illustrate the economical use of metal in forming the plates 14 and 15 and the blanks of the keepers or sockets 19 from suitable stock.

The tether of the trap consists of a suitable length of chain 25 movably attached at one end to an anchor pin 26 and having at the opposite end a swivel 27 embodying a runner loop 28. A wire, cord or thong 29 is loosely passed through the runner 28 and at its free extremity is formed with a noose 30. The opposite end of the wire, cord or thong 29 is secured to an eye 31 attached to one of the jaws adjacent to the gripping bar of the latter, and then movably passed through an eye 32 in a similar position on the opposite jaw and then across the gripping bar of the jaw and threaded through an eye 33 on the same jaw and finally passed out through a link 34 secured to the side of the jaw opposite that carrying the eye 31. The eyes 32 and 33 and the link 34 as well as the eye 31 are loosely connected to the jaws so as to readily conform to the position of the wire, cord or thong engaging the same, and by thus associating the wire, cord or thong with the jaws the latter are held in tight closed condition when the trap is sprung and a pulling strain is exerted on the tether as a whole by the efforts of the animal trapped to effect release of the caught leg. The wire, cord or thong 29 is formed with a knot 35 which serves as a stop to prevent more than a predetermined length of the said wire, cord or thong from passing through the link 34 so that there will not be too much slackness of the portion of the wire, cord or thong engaging the jaws of the trap adjacent to said jaws when the latter are opened or set, and by this means interference with the operation of the jaws and tangling of the wire, cord or thong are prevented. The wire, cord or thong 29 is also formed at an intermediate point with a loop 36 for a purpose which will be presently explained. Between the loop 36 and the noose 30 the wire, cord or thong is engaged by a closed eye 37 carried by and disposed at an angle to an arm 38 of a spring 39, the latter having a reversely extending arm 40 terminating in an angular hook 41 which is caused to engage the loop 36. The eye 37 on the free end of the arm 38 of the spring operates to force the noose 30 quickly into closed condition when the noose is released from the trap, and the said spring including the arms operates to throw the noose high upon the leg of the animal caught in the trap.

In the form of the trap shown by Fig. 9 the gripping bars 12 of the jaws 5 have their inner opposing edges smooth or without teeth, and the wire, cord or thong 29 forming part of the tether and which will be attached to the chain 25 is threaded through one of the eyes 8 of the pivot rod or pintle 7 of the jaws instead of engaging the jaws as shown by Figs. 1 and 8, the jaws of the trap shown by Fig. 9 serving solely as a means for holding the noose set or in open condition and releasing said noose when the trap is sprung so that the spring 29 may come into play and throw the noose high upon the leg of the animal and at the same time close said noose. The jaws 5 of the trap shown by Fig. 9 will be operated by a comparatively light spring and when the noose has been thrown up on the leg of the animal the latter will be enabled to easily disengage the leg from the trap and be held solely by the wire, cord or thong 29 and the remaining part of the tether. The jaws 5 of the trap shown by Fig. 9 have outwardly projecting holding lugs 42 on opposite sides of the center of each gripping bar, said lugs being integrally formed with the jaws as shown by Fig. 10 and serving as the noose supports around the trap when the latter is set. Each jaw also has keepers 43 formed integral with the inner edge thereof which are bent downwardly over and form sockets for the T-head of the plate 14 or 15 carried thereby.

In the use of a spring for slipping and closing the noose 30, the form of spring illustrated by Figs. 1, 8 and 9 is preferred, but a practical operation of the noose may be accomplished by the use of a coiled spring 44 through which the wire, cord or thong 29 is threaded, as shown by Fig. 11, the one end of the spring 44 being adapted to engage a stop 45 or be held by connecting the said end to a part of the chain link 25 which serves as a limiting means therefor, or be secured in any other preferred manner. The opposite end of the spring 24 is disposed adjacent to and co-acts with the sliding end of the noose 30. When the noose is opened to set the same over the trap jaws the spring 44 is contracted and when the jaws are sprung and the noose released therefrom the said spring 44 becomes free to exert its force on the noose and closes the latter.

The noose 30 as shown by Fig. 11 has an eye 46 at its slip end, against which a reduced portion 47 of the adjacent end of the spring has bearing to insure a reliable and positive operation of the noose. In the form of noose shown by Figs. 1, 8 and 9 the slip end thereof has a loop 48 which is caught in the eye 37 on the spring arm 38 and when the noose is released from the trap it is drawn tightly around the leg of the animal by a quick movement of the arm 38.

In setting either form of trap shown in the drawings, the jaws are opened against the resistance of the spring 9 and retained in open position by a sensitive interlock of the plates 14 and 15. The noose 30 is then opened against the portion of the spring engaging the same, and laid over the trap jaws, resting on the eyes 31, 32, 33 and 34 of the trap as shown by Figs. 1 and 8 or on the lugs 42 of the trap shown by Fig. 9, and the terminal hook 41 is caught in the loop 36 as shown by Fig. 1, and by this means sufficient tension is exerted on the noose to keep the latter in position under ordinary conditions or when unusual disturbance is not present. When the spring arm 40 is drawn toward the arm 38 to engage the loop 36 it will be obvious that a strong spring tension will be imposed upon the noose and when the trap is sprung by an animal stepping thereinto the noose will be released and the spring arms come into play to respectively throw the noose high upon the leg of the animal and to exert a strong pulling tension on the noose, as indicated by Fig. 8. When the noose is applied over the jaws of the trap the intermediate portions thereof at opposite sides of the trap will be prevented from passing downwardly under the latter by the eyes 8 on the opposite ends of the pintle rod 7. It will be understood that the eyes 31, 32, 33 and 34 and the lugs 42, together with the loops 8, prevent the noose from passing under the trap when the jaws are sprung and always insure an upward movement of the noose above the trap upon the leg of the animal at such height as to effectively secure the animal against self or accidental release.

What is claimed as new is:

1. The combination with a trap having jaws which are opened when set, of a tether anchored at one extremity and having a noose at the opposite extremity which is opened and applied over the open trap jaws, means for releasing the trap jaws, and spring means engaging an intermediate portion of the tether and the noose and operating to close the latter tightly on the leg of a trapped animal.

2. A trapping organization comprising a tether having a noose at one extremity, means for holding the noose in open position, and spring means structurally independent of the holding means for engaging the tether at an intermediate point and also movably coöperating with the noose to quickly and tightly close the latter when released.

3. A trapping organization comprising a tether having a noose at one end, spring means movably engaging the tether adjacent to the noose and operating to throw the latter upwardly and close the same, and means for holding the noose in open set position, said spring means being structurally independent of the holding means.

4. A trapping organization comprising a trap having jaws with spring closing means and devices projecting from different portions thereof, a tether coöperating with the trap and having a noose at one extremity which is opened and disposed on the projecting devices of the jaws when the latter are set, and a spring means engaging the tether and operating to close the noose and throw the latter upwardly upon the leg of a trapped animal.

5. A trapping organization comprising a trap having spring-actuated opening and closing jaws, a tether engaging the trap and having a noose at one end which is fitted over the open jaws of the trap when the latter is set, and means engaging an intermediate portion of the tether and the noose to elevate and close the latter when released by the sprung trap.

6. A trapping organization comprising a tether having a noose, resilient means slidably engaging a portion of the tether adjacent to the noose and operating to throw the latter upwardly and close the same, and means having automatically closing jaws for holding the noose in open or trapping condition, said resilient means being independent of the holding means.

7. In a trapping organization, a trap having spring-actuated jaws, a tether comprising an anchored portion carrying a runner and a continuing portion slidably engaging the runner and the trap and having a noose at its free extremity, and a spring means having portions thereof respectively engaging the continuing portion of the tether and coöperating with the noose to close the latter, the noose being applied over the open jaws of the trap when the latter is set.

8. In a trap, the combination of spring-actuated jaws having gripping bars each provided with a pair of sockets on the inner side, the sockets each embodying a bent over body with a tongue extending through and upset against its gripping bar and a stop flange bent over the outer end thereof, and setting plates each having an outer imperforate extremity with reduced ends loosely projecting into the sockets.

9. An animal trap comprising a support having movable members, a tether coöperating with the support and having a noose which is held open by the members when the trap is set and released from the members when the trap is sprung, and a resilient device having members engaging different portions of the tether and operating to throw the noose upwardly when released and also to close the noose.

In testimony whereof I have hereunto set my hand in presence of two subscribing witnesses.

HUGH L. MAINLAND.

Witnesses:
CHARLES A. ROWE,
F. B. KEEFER.

---

Copies of this patent may be obtained for five cents each, by addressing the "Commissioner of Patents, Washington, D. C."